United States Patent

Sanders et al.

[11] Patent Number: 5,824,989
[45] Date of Patent: Oct. 20, 1998

[54] METHOD TO CONTROL STARTING AND STOPPING A PLASMA ARC WELDING KEYHOLD

[75] Inventors: John M. Sanders, Jackson Township, Stark County; Patrick M. Ryan, Washington Township, Stark County, both of Ohio

[73] Assignee: McDermott Technology, Inc., New Orleans, La.

[21] Appl. No.: 933,780

[22] Filed: Sep. 19, 1997

[51] Int. Cl.[6] .................................................. B23K 10/00
[52] U.S. Cl. ............................. 219/121.46; 219/121.45; 219/60 R; 219/61
[58] Field of Search ................ 219/121.45, 121.46, 219/121.59, 121.36, 59.1, 60 R, 60 A, 61

[56] References Cited

U.S. PATENT DOCUMENTS 4,023,006  5/1977  West et al. ..................... 219/121.45
5,225,654  7/1993  Harwig et al. .................... 219/121.5
5,685,996  11/1997  Ricci ............................... 219/121.39

*Primary Examiner*—Mark H. Paschall
*Attorney, Agent, or Firm*—Robert J. Edwards; Eric Marich

[57] ABSTRACT

An improved plasma arc welding arm method and apparatus for keyhole welding rotating workpieces has an arcuate gear track supporting a corresponding arcuate geared cart bearing a plasma arc welding torch prevents voids in keyhole weld starts and finishes. The gear track is mounted on a manipulator arm for positioning the welding torch in proximity to a rotating workpiece to be welded. The torch may be rotated on the cart and gear track in the same direction and at the same rotational speed as the workpiece.

2 Claims, 1 Drawing Sheet

METHOD TO CONTROL STARTING AND STOPPING A PLASMA ARC WELDING KEYHOLD

FIELD AND BACKGROUND OF THE INVENTION

The present invention relates generally to the field of plasma arc keyhole welding and, in particular, to a new and useful method and apparatus for welding cylindrical workpieces to prevent misformed welds and typical defects such as voids and porosity at the starting and stopping positions.

Plasma arc welding (PAW) is an arc welding process that produces coalescense of metal by heating with a constricted arc between an electrode and the workpiece (transferred arc) or between the electrode and a constricting nozzle (nontransferred arc). The welding arc is generally obtained from the hot, ionized plasma gas issuing from the torch. This plasma gas is usually supplemented by an auxiliary source of shielding gas. The shielding gas may be a single inert gas or a mixture of inert gases. Filler material may or may not be added.

Plasma arc welding uses a nonconsumable electrode. The torch has a nozzle that creates a gas chamber surrounding the electrode. The arc heats the gas fed into the chamber to a temperature where it becomes ionized and conducts electricity. The ionized gas is defined as plasma.

One type of plasma arc weld which can be made is a keyhole weld. The keyhole plasma arc welding process is a high power density welding process since the arc has the capacity to penetrate through a thickness of material and make welds autogenously. The power density of the plasma arc welding process is controlled by the plasma gas flow rate and weld current, and the higher the values of these parameters, the higher the power density. However, at too high a power density and plasma gas flow rate, the process will cut the material into two pieces rather than welding it into one piece.

With keyhole welds, many times a single pass weld is all that is required to join two workpiece elements together. However, it is most difficult to initiate and terminate the welding process and achieve a good weld without creating internal defects or overpenetrating the joint. The keyhole is essentially an open hole melted through the workpiece which has molten metal sides and is held open by the force exerted by the plasma gas flow. This results in an inherently unstable mechanism during the start and stop of the weld process, since the molten metal sides of the keyhole are formed from solid metal.

When performing girth welds on cylindrical workpieces, or when other arcuate or curved workpiece are plasma arc welded, the workpieces are often rotated while the welding torch remains stationary. Starting and stopping the keyhole is the most difficult part of plasma arc keyhole welding. It is not uncommon, when plasma arc keyhole welds are made on a rotating workpiece, for voids in the weld to be created at the starting and stopping points of the weld. The voids are created by inaccuracies in the ramp-up timing between the workpiece travel speed, current level in the torch, and the plasma gas temperature. With thinner walled (less than 0.250" wall) workpieces this is less of a problem than is the case with larger, heavier workpieces. It is more difficult with thicker workpieces to synchronize these ramp-up characteristics to within a fraction of a second to avoid creating voids in a keyhole weld.

A known method of synchronizing the ramp-up characteristics and inserting material at the weld finish to avoid voids in the weld is taught by U.S. Pat. No. 5,225,654. The ramp-up parameters are continuously controlled and adjusted to prevent voids in the weld.

SUMMARY OF THE INVENTION

It is thus an object of the present invention to provide a simple method and apparatus for eliminating voids in plasma arc keyhole welds at weld starts and finishes.

Accordingly, a plasma arc welding torch is connected to a geared cart provided on a known welding manipulator arm. The cart has an arcuate shape, which corresponds to an arcuate gear track engaged with toothed gears on the cart. The gear track and cart cooperate to allow the welding torch to be rotated through the arc defined by the gear track. The manipulator arm is used to position the welding torch over a workpiece which can be rotated at a fixed speed.

When the cart and gear track attachment is used, the workpiece is brought to a constant operating speed prior to beginning the weld. As the weld is started, the cart moves on the gear track in the same direction as the workpiece is rotating, and at approximately the same rotational speed, so that the relative movement between the welding torch and the workpiece is zero until the torch current and plasma temperature are at full operating levels. In this manner, the ramp-up of the rotational speed of a large workpiece does not have to be matched to the torch ramp-up characteristics to avoid creating voids in keyhole weld starts. The process may be repeated at weld finishes.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWINGS

The only drawing is a side elevational view of a plasma arc welding torch apparatus for use with the invention.

DESCRIPTION OF THE PREFERRED EMBODIMENTS

Figure 1:
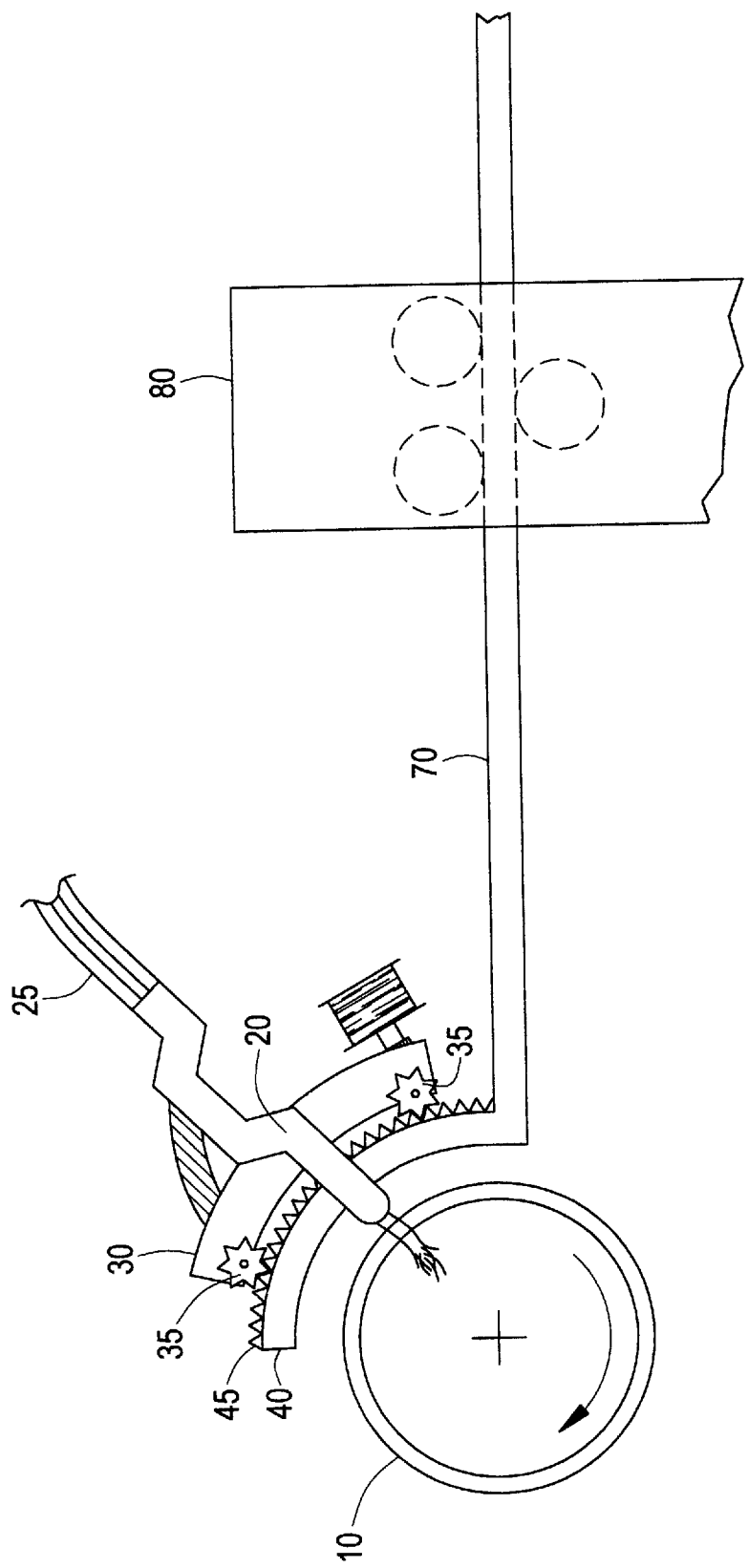

Referring now to the drawing, a plasma arc welding torch 20 connected to appropriate gas and power supplies by leads 25 is fixedly mounted on a cart 30 having toothed gear wheels 35.

The gear wheels 35 are supported on an arcuate gear track 40 having corresponding track teeth 45. Cart 30 has an arcuate shape which corresponds to the shape of the gear track 40. Gear wheels 35 support the cart 30 above the gear track 40 at a distance which allows the cart to be freely rotated through the arc defined by the gear track 40 when gear wheels 35 are rotated by any known means for driving gears and interact with track teeth 45 in a known manner. In one embodiment, the welding torch 20 is mounted to the side of the cart 30 and gear track 40 so that it does not interfere with the movement of the cart 30 on the track 40.

Gear track 40 is provided at the end of a known welding torch manipulator arm 70 which can be displaced horizontally by manipulator body 80. Manipulator body 80 may also be capable of vertical movement. Manipulator arm 70 is used to position gear track 40 and consequently, torch 20, in close relation to workpiece 10, such as for making a plasma arc keyhole weld on workpiece 10.

Workpiece 10 is mounted for rotation in any known manner. The workpiece 10 can rotate at a fixed rate and is shown by the arrow as rotating in a clockwise direction. Workpiece 10 and gear track 40 preferably can be arranged concentric, so that movement of the cart 30 along gear track 40 can be matched to the rotation of the workpiece 10.

In use, plasma arc torch 20 is positioned over workpiece 10 on cart 30 at an end of gear track 40 to allow the greatest arcuate movement possible of the cart 30 in the same direction as the rotation of workpiece 10. The manipulator arm 70 and manipulator body 80 are used to orient the gear track 40 and plasma torch 20 in close proximity to workpiece 10 for making a plasma arc weld thereon. Then, workpiece 10 is begun rotating, until the full operating rotational speed for the workpiece 10 is attained.

Once workpiece 10 is rotating at full operating speed, plasma arc welding torch 20 is activated and the torch current and plasma gas temperature are ramped up to steady state welding values. While the welding torch current and gas temperature are raised to their steady state operating values, the cart 30 with torch 20 is moved across gear track 40 in the same direction as the motion of the workpiece 10 and at the same rotational speed as the workpiece so that the relative rotation between the torch 20 and workpiece 10 is zero. The cart 30 is moved along the gear track 40 until the plasma arc keyhole is formed, at which time the cart is stopped and welding continues around the workpiece 10 as it continues to rotate at full operating speed.

This same process can be used at the weld finish, by making the relative motion between the torch 20 and workpiece 10 zero until the keyhole is filled. This allows the keyhole to close without causing voids.

The process is particularly useful with large workpieces 10 which are difficult to ramp up to full operating rotational speed in synchronization with the torch 20 characteristics. The usefulness of the invention has been proven with operational testing of the equipment, which produced keyhole welds without voids. It is estimated that for most components the improved welding arm apparatus and process can reduce repair costs due to deficiencies in known techniques by as much as 20% of the cost of the weld.

While a specific embodiment of the invention has been shown and described in detail to illustrate the application of the principles of the invention, it will be understood that the invention may be embodied otherwise without departing from such principles.

We claim:

1. A method of plasma arc keyhole welding a workpiece which eliminates voids in a resulting weld at the start and finish of the weld, the method comprising:

providing a workpiece which can be rotated;

rotating the workpiece at a fixed rate;

positioning a plasma arc welding torch adjacent the workpiece;

starting a keyhole weld with the plasma arc welding torch;

rotating the plasma arc welding torch at the same fixed rate as the workpiece such that the relative rotational motion between the welding torch and the workpiece is zero while starting the keyhole weld;

and stopping the rotation of the plasma torch while continuing the rotating of the workpiece to complete the keyhole weld.

2. The method of plasma arc keyhole welding according to claim 1, wherein completing the weld comprises rotating the welding torch so that the relative rotational motion between the welding torch and the workpiece is zero when the welding torch reaches the finish of the weld; and shutting down the welding torch so that a keyhole formed during the keyhole weld closes.

\* \* \* \* \*

UNITED STATES PATENT AND TRADEMARK OFFICE
CERTIFICATE OF CORRECTION

PATENT NO. : 5,824,989
DATED : October 20, 1998
INVENTOR(S) : Sanders et al.

It is certified that error appears in the above-identified patent and that said Letters Patent is hereby corrected as shown below:

On the title page, of the patent, and at column 1, line 3, "KEYHOLD" should be --KEYHOLE--.

Signed and Sealed this

First Day of June, 1999

Attest:

Attesting Officer

Q. TODD DICKINSON

Acting Commissioner of Patents and Trademarks